A. B. SHEPPARD.
PACKING BOX FOR PHOTOGRAPHIC PLATES.
APPLICATION FILED NOV. 14, 1907.

901,200.

Patented Oct. 13, 1908.

2 SHEETS—SHEET 1.

Witnesses.
Paul V Wheeler
Alberta Reahard

Inventor.
A. B. Sheppard
By Jess Herbit
atty.

A. B. SHEPPARD.
PACKING BOX FOR PHOTOGRAPHIC PLATES.
APPLICATION FILED NOV. 14, 1907.
901,200.
Patented Oct. 13, 1908.
2 SHEETS—SHEET 2.
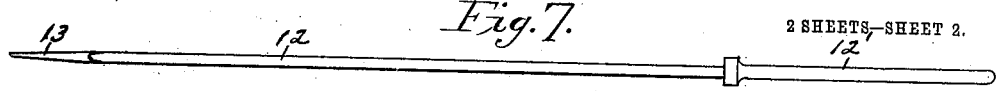
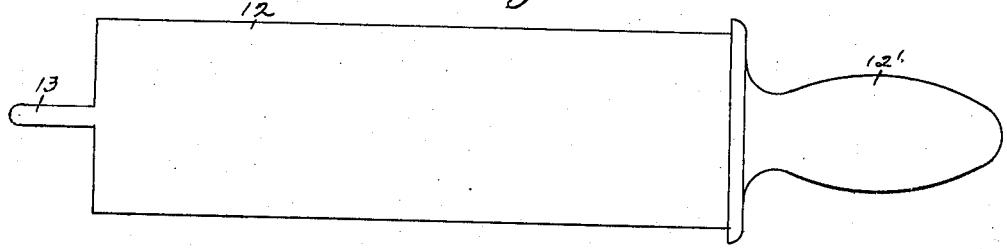
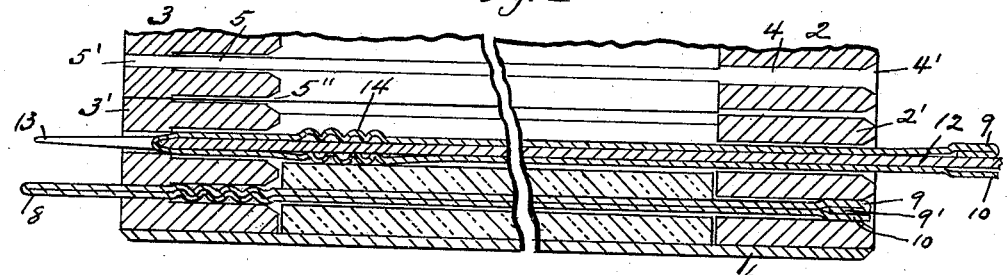
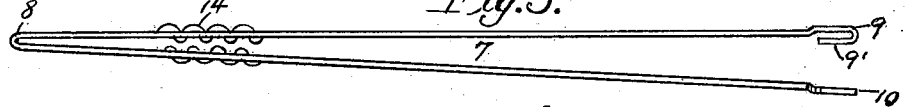
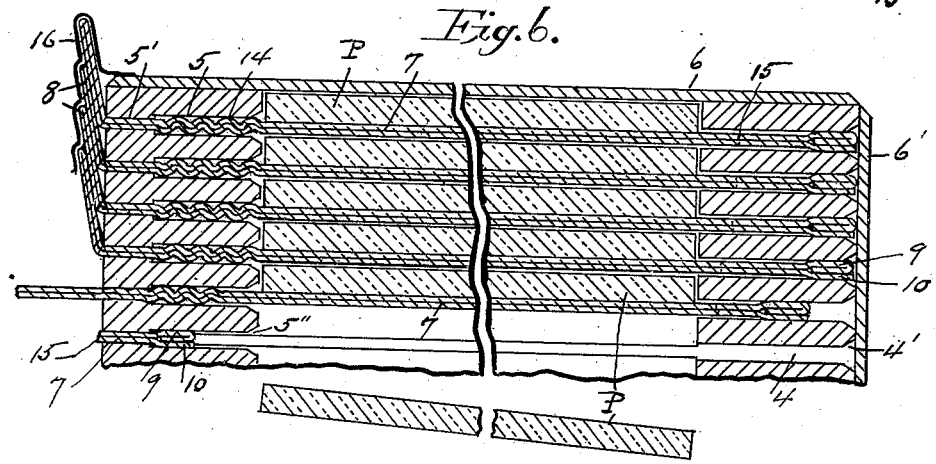
Witnesses.
Inventor.
A. B. Sheppard

UNITED STATES PATENT OFFICE.

AULEY B. SHEPPARD, OF PITTSBURG, PENNSYLVANIA.

PACKING-BOX FOR PHOTOGRAPHIC PLATES.

No. 901,200.      Specification of Letters Patent.      Patented Oct. 13, 1908.

Application filed November 14, 1907. Serial No. 402,110.

*To all whom it may concern:*

Be it known that I, AULEY B. SHEPPARD, of Pittsburg, in the county of Allegheny and State of Pennsylvania, have invented certain new and useful Improvements in Packing-Boxes for Photographic Plates, of which the following is a specification.

The present invention has particular reference to certain improvements in the package shown and described in Letters Patent granted me December 3rd, 1907, No. 872,761.

One object is to provide plate-confining slides of improved construction, such improvement having reference to the effective exclusion of light; also the formation of the box or package with reference to the insertion and withdrawal of the slides.

Figure 1:
Figure 2:
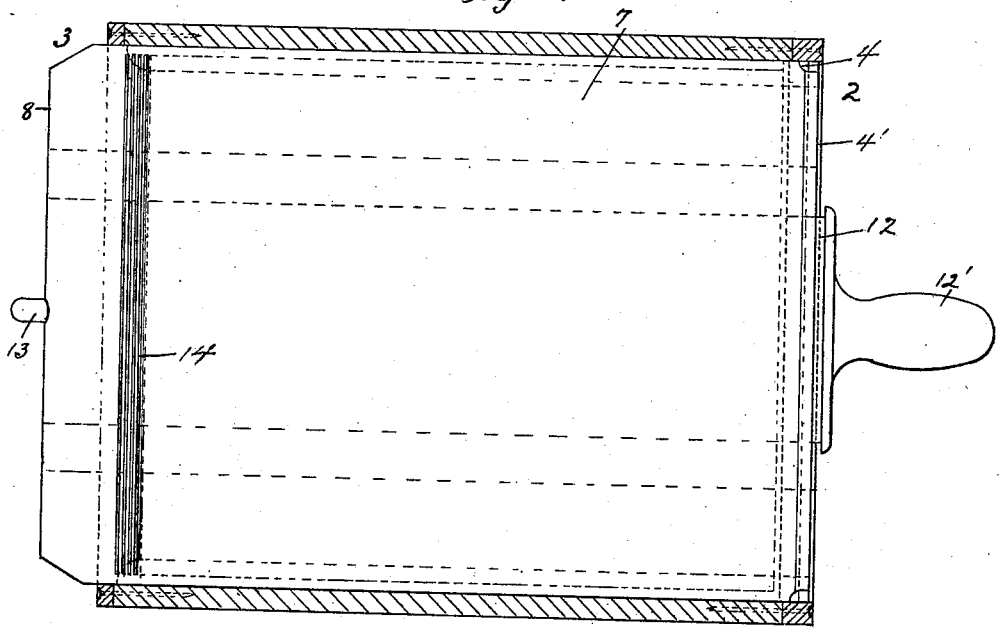
Figure 3:
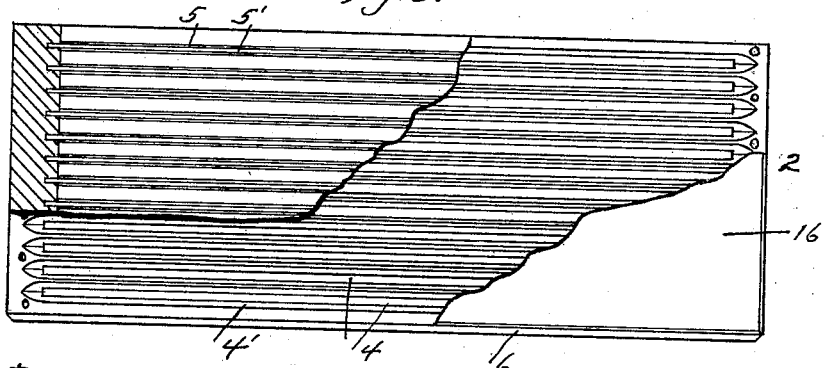

With these and other objects in view, as will presently appear, the invention consists in the novel features of construction, and in the combination of parts, hereinafter fully described and claimed and illustrated by the accompanying drawings, wherein:

Figure 1 is a vertical sectional view of a package constructed in accordance with the improvement, the same being shown partially filled with plates and slides and with the inserting device in position for placing the slides therein. Fig. 2 is a sectional plan view showing one of the slides positioned in the package by means of the inserting device. Fig. 3 illustrates in elevation a portion of the slide-inserting end of the package, and a portion of the package in section, part of the end covering being also shown. Figs. 4 and 6 are views, greatly enlarged, of portions of the package and slides in longitudinal section, Fig. 4 showing the manner of inserting the slides and the position thereof when inserted, and Fig. 6 illustrating the slides when inserted and the manner of withdrawing the same as when discharging the plates. Fig. 5 is an edge view, enlarged, of one of the slides. Figs. 7 and 8 are detail views of the slide-inserting device.

Referring to the drawings, the frame of the package is preferably constructed of wood, 2 designating the end thereof through which the plates are inserted, and 3 the opposite end through which they are withdrawn. Formed in end 2 are the plate-inserting slots 4, while in end 3 are the slots through which the slides are drawn outward, 5 designating the deeper or larger inner portions of said slots, and 5' the narrower outer portions. It will be understood that a photographic plate P is confined between adjacent slides, the package being constructed to receive a half-dozen, dozen, or any other desired number of plates. The top of the package is closed by the wood or paper board 6, and the outer face of end 2 is covered by a similar light-excluding board 6' after the package has been filled.

Each of the plate slides 7 may be formed of a double thickness of paper of suitable weight or gage, one piece being preferably used which is doubled upon itself, 8 designating the doubled or turned end. This formation brings the free edges 9 and 10 of the two thicknesses together. The extremity of end 9 is preferably folded backwardly at 9', and this fold, together with extremity 10, gives a three-ply thickness at that end of the slide, said end being referred to hereinafter as the rear end. The two thicknesses or layers of the slide are preferably pasted together at opposite sides of the center, while the central unpasted portion affords space for the blade-like slide inserting tool 12, provided with handle 12', and at its opposite end with tongue or projection 13 which pierces the folded end 8 of the slide, thus maintaining a secure hold thereon so that the movement of the slide when being inserted may be positively controlled.

When the slide is in position in the package, the three-ply rear end thereof wedges within the inlet or insertion slot 4 and tightly closes the same against the admission of light. For similarly sealing the withdrawal slot at the opposite end of the package, the doubled slide is crimped transversely at 14, the effect of which is to so thicken the same that it tightly wedges within the inner and larger portion 5 of said slot so that no light may enter.

In practice, the dry plates are placed in the package one by one, and after each plate is inserted a slide is introduced through the appropriate slot 4, the inserting tool or threader 12 having been placed within the slide for the purpose of entering it in the slot and for pushing it through to the opposite end of the package and into the corresponding slot 5, 5', as shown in Figs. 1 and 4. The entering of the slide and the inserting tool is facilitated by the beveled or enlarged entrances 4 and 5'', respectively, of slots 4 and 5.

Projection 13 of the inserting device operates as a wedge for entering said device and the slide first in slot 4 and then in slot 5, 5′, the presence of the inserting tool bowing upward the adjacent portions 2′ and 3′ of the package ends, as shown in the enlargement of Fig. 4, said parts returning to normal position when the inserting tool is withdrawn, as will be understood. When thus positioned, the thickened rear end of the slide closes slot 4, and crimp 14 is lodged within slot-portion 5, while the front or doubled end 8 is projected through the end of the package, to be grasped by the operator for withdrawing the slide when removing the plate which it confines. The outward pull of said end causes crimps 14 in the flexible material to so straighten (see near bottom of Fig. 6) as to pass outward through the contracted outer portion 5′ of the slot, and when the slide is fully withdrawn, its thickened rear end is lodged within slot-portion 5, when the slide may be torn off at the line or perforations 15, leaving the slot closed against the entrance of light, as shown at bottom of Fig. 6. After the package is filled, the outer face of its inlet end 2 is sealed by covering 6′ so that no light may enter through slots 4 even after all of the slides have been withdrawn. Instead of tearing off the withdrawn slides, they may simply remain projected through the end of the package and be reinserted if it is desired to again use the package for exposed or other plates. Extremities 8 of the slides may be turned backward, as shown in Figs. 1 and 6, and protected with a paper covering 16.

The improved package is adapted at its face opposite cover 6 to make light-excluding connection with a plate holder for the passage of plates from one to the other, as shown in my above mentioned patent. It may, however, be used simply as a commercial plate package without regard to such connection, the plates being removed in a dark room, as heretofore.

I claim:—

1. The combination of a plate package having slots through opposite walls for the passage of a slide, and a slide inserted through the slot in one wall and entered in the slot in the opposite wall for withdrawing through the latter.

2. The combination of a plate package having a slot through one wall for the entrance of a slide and a slot through the opposite wall for the withdrawal of the slide, the entrance slot being deeper than the withdrawal slot, and a slide inserted through the entrance slot and entered in the withdrawal slot, the slide having a thickened end which when the slide is in place fills the entrance slot.

3. The combination of a plate package having an entrance slot through one wall thereof and a withdrawal slot through the opposite wall, the outer portion of the withdrawal slot corresponding in depth to the thickness of the main portion of the slide and the inner portion of said slot and the entrance slot being relatively deep, and a slide extended through the entrance slot and into the withdrawal slot, the slide having a thickened end which when the slide is in place fills the relatively deep entrance slot and which thickened end fills the inner and deeper portion of the withdrawal slot when the slide is drawn outward.

4. The combination of a plate package having an entrance slot and a withdrawal slot in opposite walls thereof, and a slide inserted through the entrance slot and withdrawn through the withdrawal slot, the slide having thickened portions which close the slots against the admission of light.

5. The combination of a plate package having a slot for the passage of a slide, and a slide crimped to increase its thickness for filling the slot.

6. The combination of a plate package having an entrance slot through one wall thereof and a straight withdrawal slot through the opposite wall, and a slide inserted through the entrance slot and withdrawn through the withdrawal slot, the slide being crimped to close when in place the withdrawal slot.

7. The combination of a plate package having an entrance slot in one wall and a withdrawal slot in the opposite wall, the entrance slot and the inner portion of the withdrawal slot being deeper than the outer portion of the withdrawal slot, and a slide inserted through the slots and having a thickened end to fill the entrance slot, the slide being crimped transversely between its ends to fill the inner enlarged portion of the withdrawal slot.

8. A slide for a plate package consisting of a piece of flexible material doubled upon itself, the free end of one of the double portions being folded upon itself to provide a double thickness with the corresponding portion of the other part overlapping said doubled end, for the purpose described.

9. A slide for a plate package crimped transversely, for the purpose described.

10. A slide for a plate package consisting of a piece of flexible material doubled upon itself with portions of the adjacent faces of the doubled parts secured together and with part of the space between said faces open, for the purpose described.

11. The combination with a plate package slotted for the insertion of a slide, of a slide consisting of two layers of material, and an inserting device introduced between the layers for forcing the slide into the slot of the package.

12. The combination with a package slotted for the insertion of a slide, of a slide consisting of a piece of flexible material doubled upon itself, and an inserting tool introduced between the portions of the slide and adapted to bear against the doubled end thereof for forcing the slide into the slotted holder.

13. The combination with a plate package having slots formed through opposite walls thereof, of a slide adapted to enter through one slot and be withdrawn through the other slot, the slide being formed of a piece of flexible material doubled upon itself, and an inserting tool introduced between the portions of the slides and bearing inwardly against the doubled end therefor for forcing the slide into and through said slots.

14. The combination with a plate package slotted for the insertion of a slide, of a slide formed of a piece of material doubled upon itself, and an inserting tool introduced between the portions of the slide and bearing against the doubled end thereof, the tool being relatively thin and at its inner end provided with a tongue which projects through the doubled end of the slide, for the purpose described.

In testimony whereof I affix my signature in presence of two witnesses.

AULEY B. SHEPPARD.

Witnesses:
J. M. NESBIT,
F. E. GAITHER.